No. 893,067. PATENTED JULY 14, 1908.
K. O. GARNER.
TROLLEY POLE ATTACHMENT.
APPLICATION FILED APR. 27, 1908.

2 SHEETS—SHEET 1.

Witnesses
M. Siebler.
C. M. Theobald.

Inventor
Karl O. Garner
By R. J. McCarty
his Attorney

No. 893,067. PATENTED JULY 14, 1908.
K. O. GARNER.
TROLLEY POLE ATTACHMENT.
APPLICATION FILED APR. 27, 1908.

2 SHEETS—SHEET 2.

Witnesses
M. Siebler
C. M. Thiebald.

Inventor
Karl O. Garner.

By R. J. McCarty
his Attorney

UNITED STATES PATENT OFFICE.

KARL O. GARNER, OF WEST ALEXANDRIA, OHIO.

TROLLEY-POLE ATTACHMENT.

No. 893,067.　　　　　Specification of Letters Patent.　　　Patented July 14, 1908.

Application filed April 27, 1908. Serial No. 429,309.

*To all whom it may concern:*

Be it known that I, KARL O. GARNER, citizen of the United States, residing at West Alexandria, in the county of Preble and State of Ohio, have invented certain new and useful Improvements in Trolley-Pole Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in trolley pole attachments.

Heretofore, much annoyance and danger have attended the use of trolley poles on electric car lines owing to the insecurity of the means for supporting them on the cars, and owing to the manner of the connection between the trolley pole and its support. Such connection has heretofore been of an insecure character, often permitting the pole to become disconnected while the car is moving, and the work of replacing the trolley pole in its support is difficult and requires considerable time.

In view of these objections to the use of trolley pole supports heretofore in common use, it is the object of the present invention to provide first—a trolley pole support from which the trolley pole cannot become accidentally disconnected, and second—to provide a trolley pole support in which the connection may be speedily made between the trolley pole and its support in a comparatively short time.

Preceding a detail description of the invention, reference is made to the accompanying drawings, of which—

Figure 1:
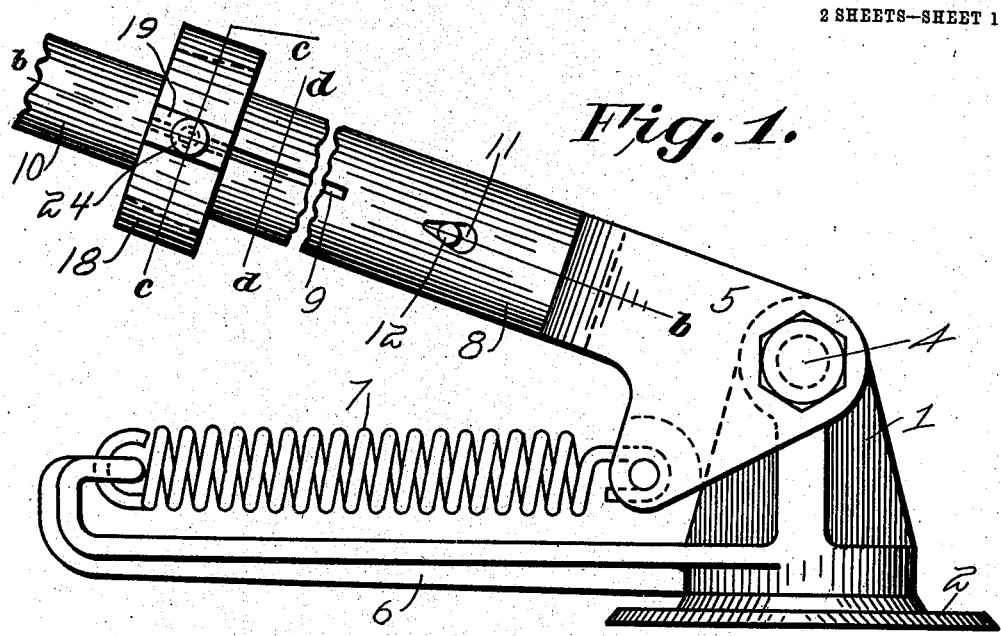
Figure 2:
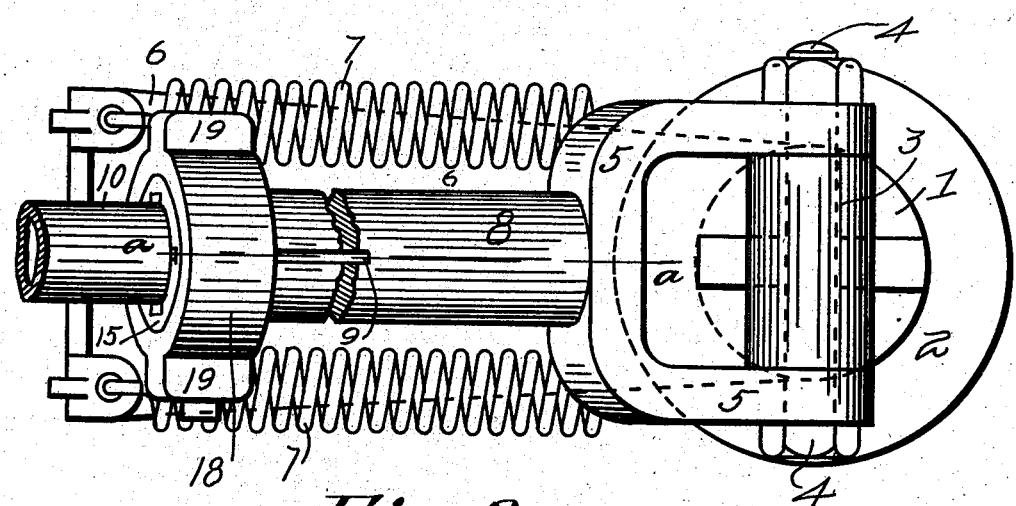
Figure 3:
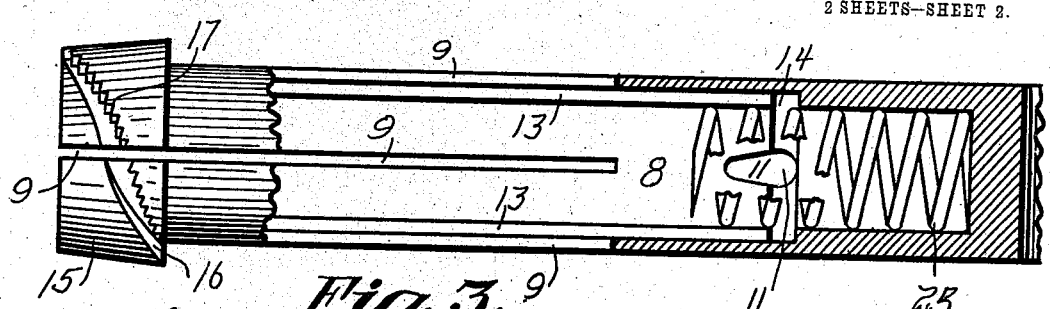
Figure 4:
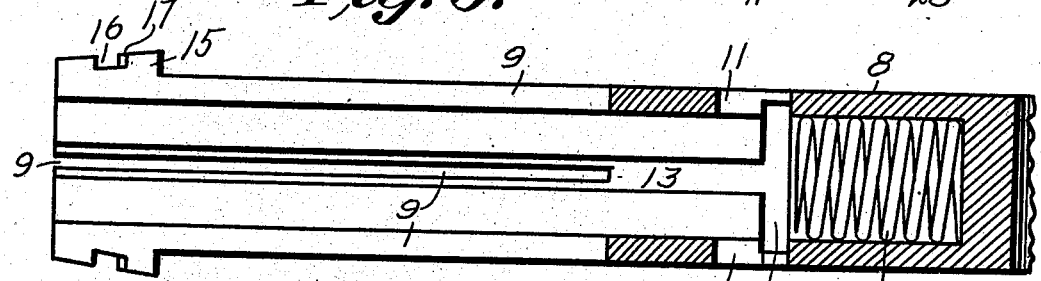
Figures 5, 6:
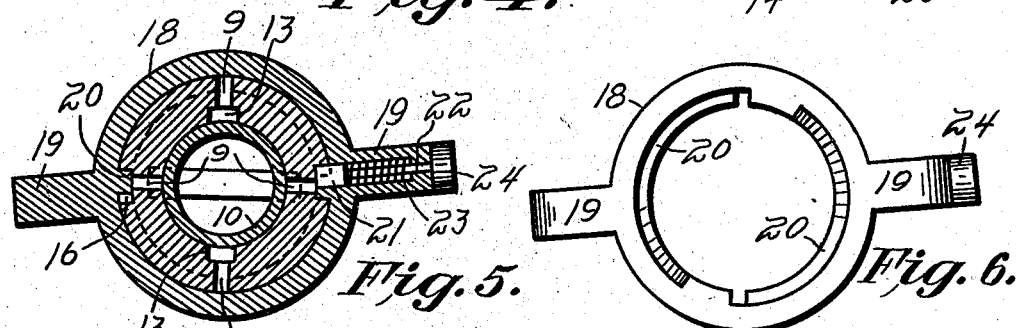
Figure 7:
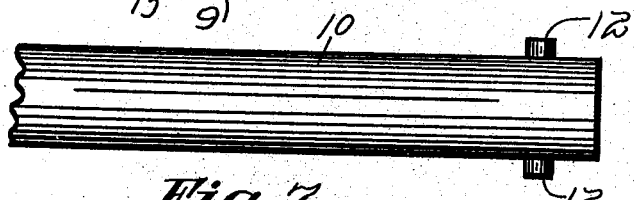
Figure 8:
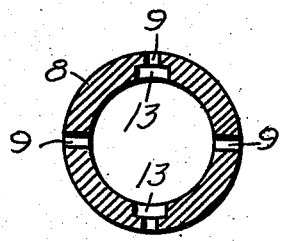

Figure 1, is a side elevation of my improved trolley pole support with parts broken away. Fig. 2, is a top plan view thereof.
Fig. 3, is a longitudinal sectional view of the tubular extension of the support on the line *a—a* of Fig. 2. Fig. 4, is a longitudinal sectional view of the tubular portion of the support on the line *b—b* of Fig. 1. Fig. 5, is a sectional view on the line *c—c* of Fig. 1. Fig. 6, is a detached view of the spanner nut. Fig. 7, is a detail view of the connecting end of the trolley pole showing the same detached from the support. Fig. 8, is a sectional view on the line *d—d* of Fig. 1.

In a detailed description of the invention, similar reference characters indicate corresponding parts.

The solid base plate 2 is rigidly attachable to the roof of a car (not shown) in the usual way, and supports the pivotal member 1 by means of a pivot connection therewith. The pivotal member 1 provides a bearing 3 at its upper end for the pivot pin 4 which passes through the arms of the yoke 5.

Extending from the supporting member 1 is an arm 6 providing means for attaching ends of coil springs 7 which are also connected with a portion of the yoke 5. The yoke 5 has a tubular extension 8 rigidly connected therewith by being formed integrally therewith. This tubular extension 8 is provided with a series of longitudinal slots 9 in opposite sides thereof which extend from suitable points inwardly to the extreme outer end thereof. These slots impart to the tubular extension a resiliency which enables it to clamp the end of the trolley pole 10 in a manner presently described. The said tubular extension has also near its base two oppositely-disposed tapering slots 11 which provide means that coöperate with the pins 12 on the end of the trolley pole 10, for locking said trolley pole to the support as more fully set forth hereinafter. The outer or upper end of the tubular extension 8 terminates in a conical-shaped head 15 through which the slots 9 extend, and which is provided with a spiral groove 16, the inner side of which has ratchet teeth 17.

Engaging the conical head 15 is a nut 18 having arms 19 extending from opposite sides thereof by means of which it is turned to clamp the tubular extension 8 in rigid contact with the portion of the trolley pole inclosed therein. The interior of the nut 18 is provided with oppositely-disposed spiral threads 20 which fit within the groove 16 of the head 15, and by turning said nut, the end of the tubular extension 8 is made to contract and to cause said tubular extension to rigidly bind the inclosed portion of the trolley pole. When the nut 18 is screwed to its limit in thus clamping the trolley pole, it is held in position by a detent 21 on the end of a plunger 22 inclosed within one of the nut arms 19 and surrounded by a helical spring 23 which normally exerts a pressure to keep the detent in engagement with the teeth 17 of the conical head 15. The plunger 22 has a finger-piece 24 by means of which the detent 21 is withdrawn from such engagement to permit the nut 18 to be detached from the head 15 in removing or replacing a trolley pole in the support.

In attaching the trolley pole, the end of the pole is inserted in the tubular extension 8 with the pins 12 lying within the slots 13 in the opposite interior sides of the tubular extension; the trolley pole is moved inwardly in said extension until the pins 12 enter the annular space 14 on the interior of the tubular extension, and the pole is then turned until the pins arrive at the slots 11 in the opposite sides of said tubular extension. In thus moving the pole into the socket to its limit, the helical spring 25 seated in the base of the tubular extension is compressed by the end of the pole, and when the pole is turned until the pins arrive at the slots 11, it is released and the expansion of the spring 25 moves the pole outwardly, and the pins 12 into the forward or smaller portions of the slots 11, thus completing the locking engagement between the inner end of the pole and the tubular extension which prevents any withdrawal of the pole from its socket.

The nut 18 has been loosened preparatory to the insertion of the trolley pole, and is tightened by screwing it upon the conical head 15 until the sides of the tubular extension clamp the pole to the end of the said extension.

It will thus be seen that the trolley pole is most securely and firmly held in position in its support with no possibility of working loose or turning in the tubular extension. The result is—that the trolley wheel is always maintained in a true position relative to the wire, and the life of said wheel is thus protected against uneven wear due to an improper connection or engagement between the trolley wheel and the wire. And further, in the event of damage to the trolley fixture, as for example, the breaking of a pole, it may be easily detached and a new pole replaced.

I claim:

1. The combination with a trolley pole having laterally extending pins thereon, of a supporting member having a tubular extension adapted to receive the end of said trolley pole, said extension having slots therein adapted to receive the pins on the trolley pole, means for holding said pins in an interlocking engagement with said slots, and means for clamping the tubular extension around the portion of the trolley pole inclosed therein.

2. In a trolley pole supporter, the combination with a trolley pole having locking pins or projections thereon, of a supporting mem- ber having a tubular extension to receive the end of the trolley pole, said tubular extension having slots therein to receive the locking pins or projections on the trolley pole, a spring engaging the end of the trolley pole to maintain the interlocking connection between said pole and the tubular extension, and a compression nut engaging the end of the tubular extension to clamp said tubular extension upon the portion of the trolley pole inclosed therein.

3. In a trolley pole support, the combination with a trolley pole, of a support therefor having a tubular extension to receive the end of the pole, said tubular extension being adapted to be compressed to bind or clamp the portion of the pole lying therein, means on said tubular extension for so binding or clamping it against the pole, and means on the inner portion of the pole coöperating with slots in the tubular extension to maintain said pole in the extension and to thus afford additional means for connecting the trolley pole with its support.

4. In a trolley pole supporter, the combination with a trolley pole, of a supporting member having a tubular extension to receive the end of the pole, said tubular extension being slotted longitudinally and provided with an enlarged portion on its outer end, said enlarged portion having a spiral groove therein, a nut coöperating with said enlarged portion to clamp the tubular extension in rigid contact with the portion of the pole inclosed therein, and means for locking said nut in position to thus clamp the tubular extension upon the pole.

5. In a trolley pole supporter, the combination with a trolley pole, of a support therefor having a tubular extension to receive the end of said pole, said tubular extension having slots in the sides thereof adjacent to its base, and longitudinal slots extending to the end thereof, pins on the inner end of said trolley pole adapted to enter the slots in the tubular extension adjacent to the base thereof, means for maintaining a locking engagement between said pins and said slots, a nut engaging the end of the tubular extension to clamp it in contact with the trolley pole, and means in said nut for locking the same in a clamping position.

In testimony whereof I affix my signature, in presence of two witnesses.

KARL O. GARNER.

Witnesses:
   CAROLYN M. THEOBALD,
   MATTHEW SIEBLER.